United States Patent

[11] 3,613,667

| [72] | Inventor | Charlotte Beck<br>Stuttgart-Mohringen, Germany |
|---|---|---|
| [21] | Appl. No. | 811,833 |
| [22] | Filed | Apr. 1, 1969 |
| [45] | Patented | Oct. 19, 1971 |
| [73] | Assignee | Waller Beck KG. Kontroll-und<br>Fernmessgerate<br>Stuttgart-Mohringen, Germany |
| [32] | Priority | Apr. 1, 1968 |
| [33] | | Switzerland |
| [31] | | 4944 |

[54] BLOOD-PRESSURE-MEASURING DEVICE WITH PULSE-RATE TIMER
6 Claims, 4 Drawing Figs.

[52] U.S. Cl. .................................................. 128/2.05 G
[51] Int. Cl. .................................................. A61b 5/02
[50] Field of Search .................................... 128/2.05 C,
2.05 M, 2.05 P, 2.05 R, 2.05 T, 2.05 U; 73/402;
58/46, 46.5

[56] References Cited
UNITED STATES PATENTS
2,524,470  10/1950  Pagnard ..................... 58/46 X
FOREIGN PATENTS
230,942  2/1911  Germany ..................... 128/2.05 U
87,668  1/1921  Switzerland ................ 128/2.05 P Primary Examiner—William E. Kamm
Attorney—Karl F. Ross ABSTRACT: A sphygmomanometer for use with a pressurizable, blood-restricting sleeve has a cylindrical housing comprising a core formed with a lateral hollow and an elastic skin stretched over the core spanning the hollow to form a hand-actuatable pump for pressurizing the sleeve. A short-interval timer (clock) and a pressure indicator responsive to pressure in the sleeve are mounted on one end of the housing and each has a scale on a common dial plate. Turning a rotatable control ring surrounding the housing in one sense actuates a valve for bleeding the sleeve to measure blood pressure, and turning it in the other sense starts the timer for measurement of pulse rate.

PATENTED OCT 19 1971

Charlotte Beck
INVENTOR.

BY
Karl G. Ross
ATTORNEY

Charlotte Beck
INVENTOR.

BY Karl F. Ross
ATTORNEY

BLOOD-PRESSURE-MEASURING DEVICE WITH PULSE-RATE TIMER

The present invention relates to a combination sphygmomanometer and pulse-rate timer.

Sphygmomanometers generally consist of a pump for pressurizing the sleeve, a meter for monitoring pressure in the sleeve, and a valve for bleeding air from the sleeve.

Generally speaking, the pulse of a patient must often be counted also wherever the blood pressure is measured. For this purpose the sphygmomanometer is generally laid aside and the pulse rate determined with the aid of a stopwatch or the sweep hand on a wristwatch.

It is the principal object of the present invention to provide an improved pulse-rate timer.

Another object of this invention is to provide a sphygmomanometer which can also be used for determination of pulse rate.

Yet another object of the invention is to provide a sphygmomanometer which is easy to operate with one hand for both measuring pulse rate and taking blood pressure.

The above and other objects are attained, in accordance with the present invention, with a sphygmomanometer having a common dial on which both pressure and time indicators are provided in conjunction with respective scales. A pressure-measuring device and a timer are coupled to these indicators, respectively, with a common control ring serving to operate them selectively.

More particularly, this invention is used with a sphygmomanometer as described and claimed in the commonly assigned concurrently filed application Ser. No. 811,940 and entitled "Sphygmomanometer."

The above-mentioned application discloses a sphygmomanometer operable with one hand and having a cylindrical housing in which a pump for inflating a blood-flow-restricting sleeve is formed by a deflectable wall of the housing. A meter for indicating pressure, provided with a suitable pressure-sensing means, is removably fitted on the end of the housing, and a control ring surrounds the housing axis between the meter and the pump. A valve for bleeding the air from the sleeve is operated by rotation of the control ring. Means are provided for centering the pointer of the meter at a zero indication and for establishing the desired ratio of pressure to meter displacement, thereby enabling calibration of the device.

In the present invention, the above-described general structure is used but the control ring is linked to the timer to allow simple one-handed use of the sphygmomanometer as a short-interval timer for measuring pulse rate, the ring triggering operation of the elapsed-time indicator.

The above and other objects, features and advantages of the present invention will be more fully described below, with reference to the accompanying drawing, in which.

Figure 1:
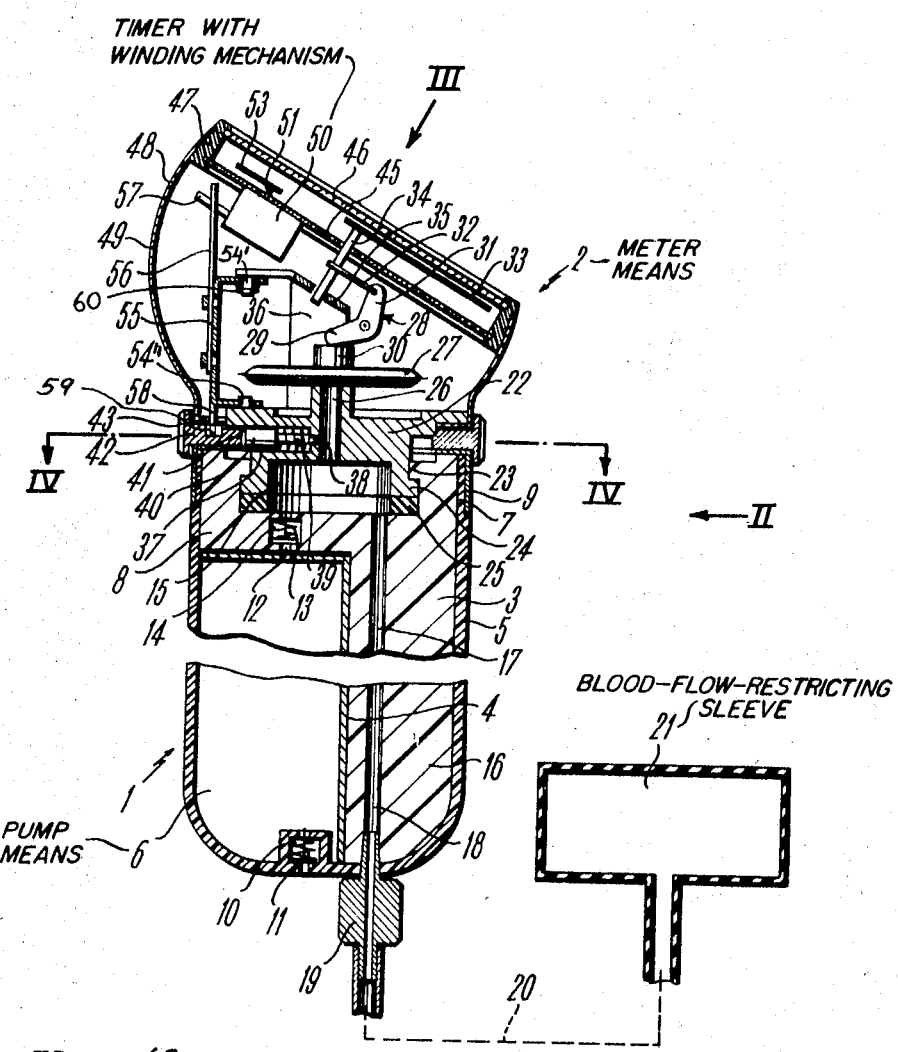
FIG. 1 is a longitudinal section through a sphygmomanometer according to the present invention.
Figure 4:
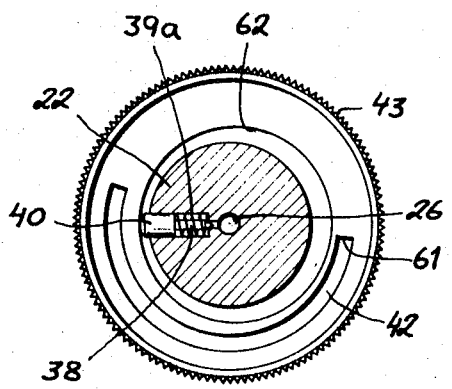
FIG. 4 is a section along line IV—IV of FIG. 1.
Figure 2:
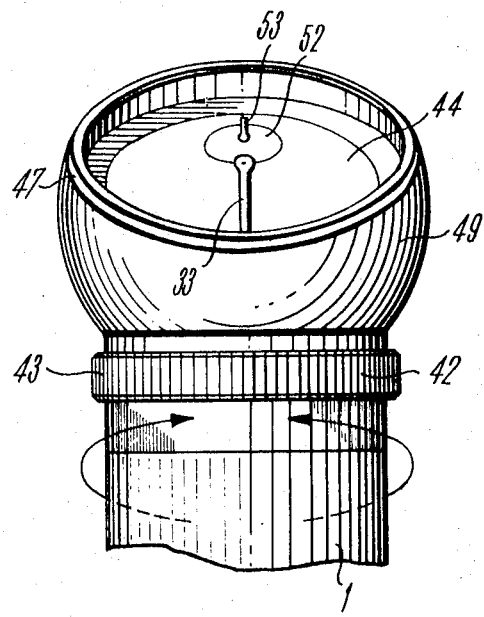
FIGS. 2 and 3 are views taken in the directions of arrows II and III, respectively of FIG. 1.
Figure 3:
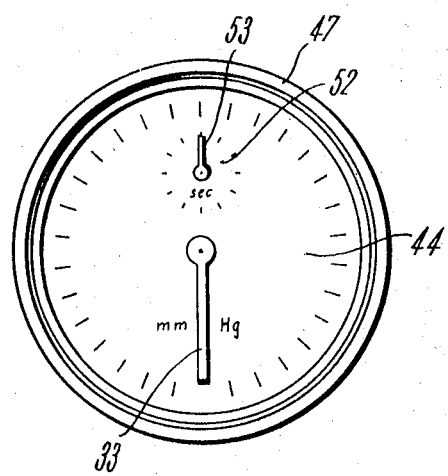

As shown in FIGS. 1–4, the sphygmomanometer according to the present invention comprises a cylindrical housing 1 on which a meter 2 is mounted. The housing 1 consists of a synthetic resin core 3 formed with a lateral hollow 4 over which an elastic synthetic resin or rubber (elastomer) skin 5 is spanned to form a pump or bulb 6. An upper edge 7 of the skin or sheath 5 is held tightly against an upper end 8 of the core 3 by a metal ring 9. The bulb 6 is formed at its lower end with a pocket 10 in which a conventional inlet check valve 11 is mounted. This valve communicates between the exterior and the pump chamber. The upper portion 8 of the core 3 is similarly formed with a pocket 14 which communicates with the bulb 6 through an opening 12 and houses a check valve 13.

A chamber 15 is connected via a bore 17 passing through a lower portion 16 of the core 3 to a conventional blood-restricting sleeve 21 which has a tube 20 whose male connection or fitting 19 plugs into an extreme lower end 18 of the bore 17. The check valve 13 permits airflow from the bulb 6 into the chamber 15.

A base 22 of the meter 2 is releasably coupled to the core 3 by bayonets 24 fitting in slots under a rim 23 (when the base is thrust into the housing and rotated) of the upper portion 8, and is sealed by a washer 25. A quick-release thread connection may of course be substituted. A further bore 26 in the base 22 connects a pressure-sensing capsule 27 having a top wall or diaphragm displaceable by air pressure and fitted with a stud 30 against which one arm 29 of a two-arm lever 28 bears. Another arm 31 of this lever 28 is attached via a chain 32 to shaft 34 journaled in a plate 35 mounted on a support 36 and carrying a pointer 33. The chain 32 is wound about this shaft.

A bore 37 formed in the base 22 communicates with the bore 26 through a port 38. A valve body 40 outwardly biased by a spring 39a and having a pointed pin or needle 39 engageable in this port 38 can completely or partially block airflow therethrough. An end 41 of this body 40 is engageable by a camming surface 62 of a control ring 42 formed with mills 43 to enable it to be gripped readily. Thus, rotation of the ring 42 can open or close the port 38 and thereby control venting of the pressure therethrough and buildup of pressure in the sleeve.

A pressure scale 44 is printed on a dial plate 45 through which the shaft 34 passes. A glass or window 46 mounted in a gasket 47 fitted on a rim 48 of a semispherical meter housing 49 protects the scale 44 and pointer or indicator 33 which cooperates therewith.

Also mounted on the dial plate 45 is a short-interval timer 50 having a shaft 51 mounting a pointer 53 associated with its own second scale 52. A pivot pin 54' mounted on the support 36 and a pivot pin 54" on the base 22 serve to journal a U-shaped strip 55 which mounts a bar 56 engageable with an actuating arm 57 of the timer 50. The U-shaped strip 55 also carries a pin 58 engageable with a stop 61 of a groove 59 and is biased by a spiral spring 60 on the pin 54' in the counterclockwise direction. The bar 56 and pin 58 form an elongated operating member for the arm 57.

To use the instrument, first the ring 42 is rotated counterclockwise to force the pin 39 into the port 38 and then the bulb 6 is alternately compressed and released to pump up the sleeve 21 to completely stop blood flow. Then the ring 42 is rotated clockwise enough to slowly vent this sleeve 21 and the systolic and diastolic blood pressure readings are taken in the customary manner.

Subsequently, in order to count the pulse, the ring 42 is further rotated clockwise to bring the ridge 61 into engagement with the pin 58 and to crank the timer-actuating arm 57 enough to wind the timer 50 for several minutes, running time; members 50, 57 thus constitute a winding mechanism. Then the pulse rate can be measured referring to the elapsed-time dial 52.

The improvement described and illustrated is believed to admit of many modifications within the ability of persons skilled in the art, all such modifications being considered within the spirit and scope of the invention except as limited by the appended claims.

I claim:
1. A sphygmomanometer comprising, in combination,
    a blood-flow-restricting sleeve;
    pump means for pressurizing said sleeve;
    an elongated housing receiving said pump means;
    meter means on an end of said housing having a blood pressure indicator connected with said sleeve and an elapsed-time indicator including a winding mechanism having an actuating arm; and
    control means on said housing for triggering operation of said elapsed-time indicator, said control means including a control ring rotatably mounted on and surrounding said housing for rotation about the longitudinal axis thereof in a plane perpendicular to said axis between said pump means and said meter means and actuating means operatively connecting said control ring with said actuating arm.

2. A sphygmomanometer comprising, in combination,
a blood-flow-restricting sleeve;
pump means for pressurizing said sleeve;
an elongated housing;
meter means on an end of said housing having a blood pressure indicator connected with said sleeve and an elapsed-time indicator including a winding mechanism having an actuating arm; and
control means on said housing for triggering operation of said elapsed-time indicator, said control means including a control ring rotatably mounted on said housing for rotation about the longitudinal axis thereof and actuating means operatively connecting said control ring with said actuating arm said control ring being provided with an engaging formation and said actuating means including a longitudinally extending pivotal elongated member having one end engaging said formation and another end engaging said actuating arm for displacement of the latter by said ring.

3. The sphygmomanometer defined in claim 2 wherein said formation is a longitudinally raised portion on said ring.

4. The sphygmomanometer defined in claim 2, further comprising means on said housing pivotally supporting said member for swinging movement about an axis extending substantially parallel to the major dimension of the elongated member.

5. The sphygmomanometer defined in claim 2 wherein said control ring surrounds said housing.

6. The sphygmomanometer defined in claim 2, further comprising a dial plate having a pressure scale in the path of said pressure indicator and an elapsed-time scale in the path of said elapsed-time indicator, and a window for viewing said scales.